US006598883B1

United States Patent
Hammi et al.

(10) Patent No.: US 6,598,883 B1
(45) Date of Patent: Jul. 29, 2003

(54) RESILIENT ELASTOMER AND METAL RETAINER GASKET FOR SEALING BETWEEN CURVED SURFACES

(76) Inventors: Ray J. Hammi, 833 Pebble Pl., El Cajon, CA (US) 92019; Alan C. Bettencourt, 1310 Santa Luisa Dr., Solana Beach, CA (US) 92075

( * ) Notice: Subject to any disclaimer, the term of this patent is extended or adjusted under 35 U.S.C. 154(b) by 76 days.

(21) Appl. No.: 10/114,563

(22) Filed: Apr. 1, 2002

Related U.S. Application Data

(63) Continuation of application No. 09/548,406, filed on Apr. 12, 2000, now Pat. No. 6,460,859.

(51) Int. Cl.[7] .............................................. F02F 11/00
(52) U.S. Cl. ..................... 277/596; 277/612; 277/616; 277/649; 277/312
(58) Field of Search ................... 277/596, 612, 277/616, 649, 312

(56) References Cited

U.S. PATENT DOCUMENTS

| | | | |
|---|---|---|---|
| 1,986,465 A | | 1/1935 | Dempsey |
| 2,517,012 A | | 8/1950 | Miller |
| 2,722,043 A | | 11/1955 | Nenzell |
| 3,029,480 A | * | 4/1962 | Signorelli et al. .......... 277/649 |
| 3,195,906 A | | 7/1965 | Moyers |
| 3,215,442 A | * | 11/1965 | Papenguth .................. 277/611 |
| 3,259,404 A | | 7/1966 | Papenguth .................. 285/212 |
| 3,355,181 A | * | 11/1967 | Olson ......................... 277/616 |
| 3,531,133 A | * | 9/1970 | Sheesley ..................... 277/616 |
| 3,578,346 A | * | 5/1971 | Jelinek ........................ 277/611 |
| 3,635,480 A | | 1/1972 | Bain et al |
| 3,720,420 A | * | 3/1973 | Jelinek et al. ............... 277/638 |
| 3,738,670 A | * | 6/1973 | Jelinek et al. ............... 277/632 |
| 3,746,348 A | * | 7/1973 | Stone .......................... 285/95 |
| 3,863,421 A | | 2/1975 | Busch et al. |
| 4,026,565 A | * | 5/1977 | Jelinek ........................ 277/639 |
| 4,254,960 A | * | 3/1981 | Jelinek ........................ 277/644 |
| 4,291,816 A | | 9/1981 | Lamoureux |
| 4,293,135 A | * | 10/1981 | Wallace ...................... 277/630 |
| 4,321,225 A | * | 3/1982 | Jelinek ........................ 264/138 |
| 4,324,517 A | | 4/1982 | Dey |

(List continued on next page.)

FOREIGN PATENT DOCUMENTS

| | | |
|---|---|---|
| CN | 681043 | 12/1992 |
| DE | 4230720 | 3/1994 |
| EP | 0187554 | 7/1986 |
| EP | 0811800 | 12/1997 |

OTHER PUBLICATIONS

Parker–Hannifin Corporation Seals Catalog No. OSD 9000, entitled "The Engineered Seal Concept" copyrighted 1992.
Parker–Hannifin Corporation Seals Catalog No. OSD 6411a, entitled "Gask–O–Seal Handbook" copyrighted 1996.
Parker–Hannifin Corporation Seals Catalog No. 5000A, entitled "Y2000 Sealing Solutions Guide" copyrighted 1997/.
Parker–Hannifin Corporation Seals Catalog No. OSD–5111, entitled "Engineered Sealing Solutions For Semiconductor Applications" copyrighted 1999.

*Primary Examiner*—Anthony Knight
*Assistant Examiner*—E Peavey
(74) *Attorney, Agent, or Firm*—John A. Molnar, Jr.

(57) ABSTRACT

A gasket assembly for interposition between a mating, mutually-opposed pair of curved surfaces. The gasket includes a flexible metal retainer, and at least one seal element which is supported on the retainer along at least a portion of the inner or outer perimeter thereof. In a stressed state, such as under compression between two curved interface surfaces, the retainer is made to conform to curvatures of the surfaces. However, upon being removed from compression, the retainer substantially recovers to its normal state.

27 Claims, 9 Drawing Sheets

U.S. PATENT DOCUMENTS

| | | | |
|---|---|---|---|
| 4,530,443 A | | 7/1985 | Gorges |
| 4,572,522 A | * | 2/1986 | Smagatz ...................... 277/632 |
| 4,579,248 A | | 4/1986 | Gorges |
| 4,690,413 A | | 9/1987 | Adkins |
| 4,776,483 A | | 10/1988 | Currey |
| 5,145,190 A | * | 9/1992 | Boardman .................. 277/596 |
| 5,149,108 A | | 9/1992 | Leiszter |
| 5,149,109 A | * | 9/1992 | Jelinek et al. .............. 277/632 |
| 5,161,808 A | * | 11/1992 | Walters ...................... 277/632 |
| 5,213,286 A | | 5/1993 | Elliott et al. |
| 5,236,203 A | * | 8/1993 | Uchida et al. .............. 277/591 |
| 5,513,603 A | | 5/1996 | Ang et al. |
| 5,536,023 A | * | 7/1996 | Surbrook et al. ........... 277/593 |
| 6,027,126 A | | 2/2000 | Peterschmitt et al. |
| 6,173,967 B1 | * | 1/2001 | Eskew et al. ............... 277/626 |
| 6,460,859 B1 | * | 10/2002 | Hammi et al. .............. 277/596 |

* cited by examiner

RESILIENT ELASTOMER AND METAL RETAINER GASKET FOR SEALING BETWEEN CURVED SURFACES

CROSS-REFERENCE TO RELATED APPLICATION

This application is a continuation of U.S. application Ser. No. 09/548,406, filed Apr. 12, 2000, now U.S. Pat. No. 6,460,859 entitled "Resilient Elastomer and Metal Retainer Gasket for Sealing Between Curved Surfaces," the disclosure of which is expressly incorporated herein by reference.

BACKGROUND OF THE INVENTION

The present invention relates broadly to a sealing construction for providing a fluid seal intermediate a pair of opposed, mating parts or structures, and more particularly to a combination metal and elastomer gasket construction adapted to provide a fluid seal between such mating structures as aircraft wings and fuel access panels having faying surfaces which exhibit a simple or compound curvature.

Gaskets of the type herein involved are employed in a variety of sealing applications, such as in commercial, industrial, or military equipment, vehicles, or aircraft for compression between the opposing or faying surfaces of a pair of mating parts or structures to provide a fluid-tight interface sealing thereof. In basic construction, such gaskets are typically are formed of a relatively compressible, annular seal member having a central aperture configured for registration with the corresponding margins of the surfaces.

The seal member typically is supported by an annular metal or plastic retainer. In such an arrangement, the retainer is stamped or molded to conform to the surface geometry of the mating structures, with the seal member being, molded-in-place in a groove formed into one or both sides of the retainer, or about the inner and/or outer periphery of the retainer to form an integral gasket structure. Representative retainer-supported gaskets are shown, for example, in U.S. Pat. Nos. 3,195,906; 3,215,442; 3,259,404; 3,578,346; 3,635,480; 3,720,420; 3,746,348; and 4,026,565, and are marketed commercially by the O-Seal Division of Parker-Hannifin Corporation, San Diego, Calif. under the tradename "Integral Seals."

In service, the gasket is clamped between the mating surfaces to effect the compression and deformation of the seal member and to develop a fluid-tight interface with each of those surfaces. Most often, the compressive force is provided using a circumferentially spaced-apart arrangement of bolts or other fastening members, each of which is received through an indexed pair of bores formed within the surfaces. Depending upon the geometry of the gasket, the fastening members also may be indexed through corresponding apertures formed within the seal or retainer member of the gasket.

Heretofore, the sealing of surfaces having a single degree of curvature or multiple, i.e., compound, degrees of curvature generally dictated that the retainer of the gasket be pre-formed into the desired shape prior to installation. However, and as is described in U.S. Pat. Nos. 4,254,960 and 4,321,225, the molding of seal elements onto a curved retainer requires special tooling. Alternatively, the gasket can be made flat and then pressed or otherwise bent into shape in a separate forming operation. With either of the present options, the cost associated with the manufacture of a curved gasket is increased over that of a comparable flat gasket.

Moreover, curved gaskets are often used to seal mirror-imaged parts, such as corresponding fuel access panels on the left and right sides of an aircraft. In service, however, the gaskets for the respective sides of the aircraft cannot be interchanged and therefore must be segregated to avoid "part confusion."

In view of the foregoing, it is apparent that improvements in the manufacture of metal and elastomer gaskets for curved surfaces would be well-received by industry. A preferred gasket construction would be economical to manufacture, but also would exhibit reliable sealing performance. Such a gasket additionally would be capable of providing fluid sealing with a minimum of compression set and resultant torque loss.

BROAD STATEMENT OF THE INVENTION

The present invention is directed to a gasket construction particularly adapted for providing a fluid-tight seal intermediate an opposing pair of curved interface surfaces such as may be found between an aircraft wing and a mating fuel access door. The gasket includes a generally planar retainer which extends within the plane thereof to a first dimension along at least one first radial axis, and to a second radial dimension along at least one second axis disposed generally normal to the first axis. The retainer further has an inner and an outer diametric extent which define an inner and outer perimeter of a closed geometric shape. At least one generally annular seal member formed of an elastomeric material is bonded or otherwise integrally attached to one or both of the inner or outer periphery of the retainer to be compressible intermediate a pair of interface surfaces for providing a fluid-tight seal therebetween.

In accordance with the precepts of the present invention, the retainer is stamped or otherwise formed of a thin, i.e., preferably about 25 mil or less, sheet of aluminum or other metal to be resiliently flexible in the first dimension along a first radius of curvature and in the second direction along a second radius of curvature. In this way, the gasket may be made to conform in an axially stressed state to simple or compound curved interface surfaces for the fluid-tight sealing thereof. However, in being resilient, the gasket is able to return to its generally planar normal state without appreciable permanent deformation or set.

Advantageously, the gasket of the invention therefore may be employed to provide a seal between, for example, a curved or compound curved aircraft wing and a mating fuel access door without the need and expense of having to pre-form the gasket into a curved shape. In this regard, the gasket also is particularly suited for use in field repairs or retrofit applications in eliminating the need to shape the gasket prior to installation. Moreover, in having a flat, normal orientation, a single gasket configuration may be interchangeably used for mirror-imaged parts without having to provide separate, side-specific configurations. Such capability provides additional cost savings and further eliminates the potential for "part confusion."

The present invention, accordingly, comprises the apparatus and method possessing the construction, combination of elements, and arrangement of parts and steps which are exemplified in the detailed disclosure to follow. Advantages of the present invention include a sealing gasket construction which exhibits reliable sealing properties and torque retention with a minimum of compression set. Additional advantages include a gasket construction which is economical to manufacture, and which may be used to seal simple or compound curved surfaces. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
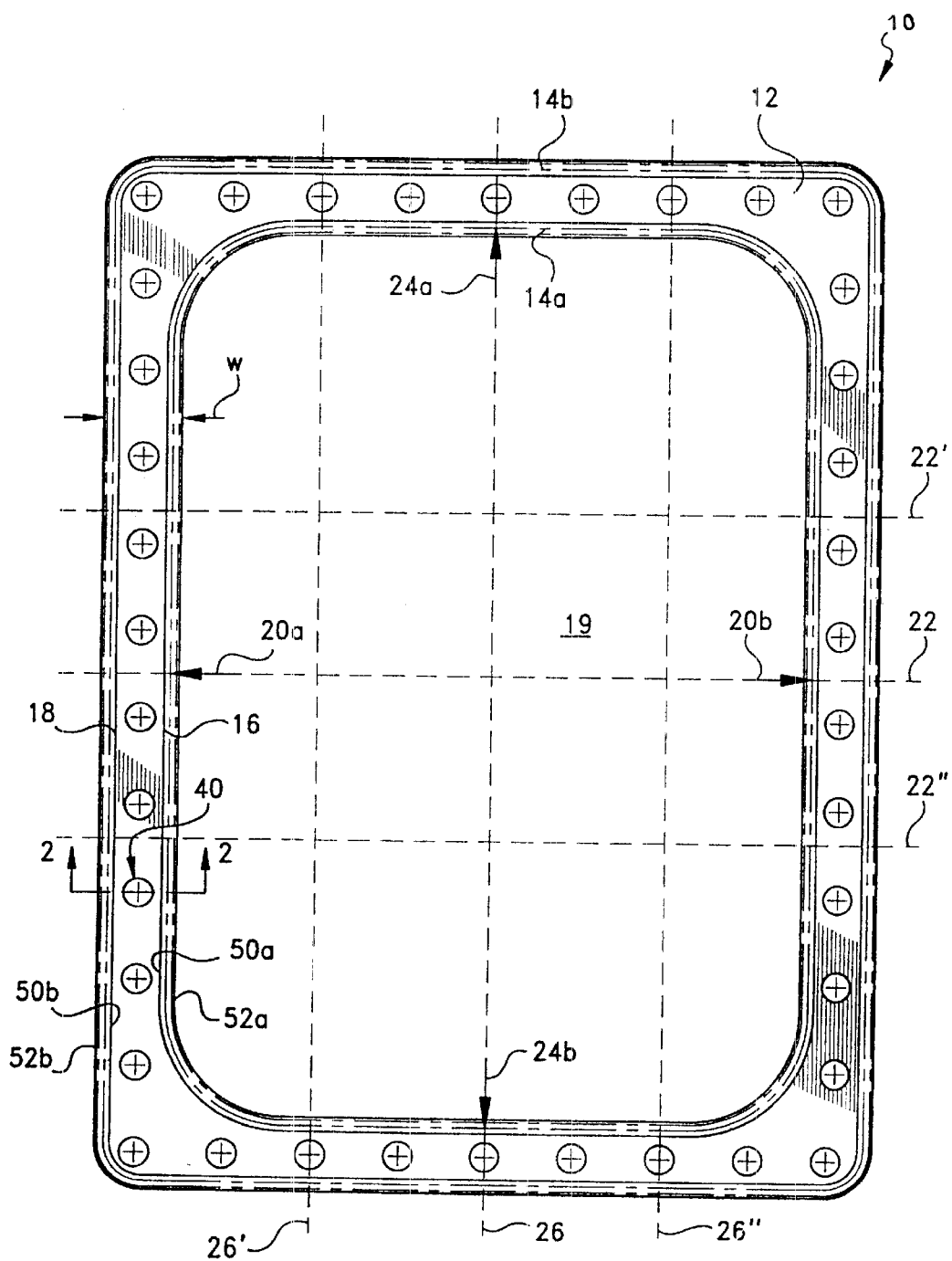
FIG. 1 is a plan view of a representative embodiment of a flexible gasket according to the present invention.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the precepts of the flexible gasket construction of the present invention are described for illustrative purposes in connection with the configuration thereof for use as a seal between a fuel or other access panel or door and the wing or other superstructure of an aircraft. Assemblies of such type are shown, for example, in U.S. Pat. Nos. 5,213,286; 4,776,483; 4,579,248; 4,530,443; 4,324,517; 4,219,816; 3,863,421; and 2,517,012. With the interface surface of these structures registered in confronting opposition, the gasket of the invention may be compressed therebetween by means of a plurality of bolts or other fastening members received through registered pairs of openings spaced circumferentially about the interface surfaces.

In view of the discourse to follow, however, it will be appreciated that aspects of the present invention may find utility in other fluid sealing applications requiring a flexible gasket of the type herein involved. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, shown generally at 10 in FIG. 1 is a representative embodiment according to the present invention of a flexible gasket configured for interposition between a mating pair of curved, mutually-opposed interface surfaces. In basic construction, gasket 10 includes a generally planar and annular, metal retainer, 12, and at least one and, preferably, a first and a second seal element, respectively, 14a–b, both of which elements are supported on a corresponding periphery of the retainer to be compressible intermediate the interface surfaces (not shown in FIG. 1) for effecting a first and second fluid-tight sealing thereof.

Retainer 12 is formed having an inner perimeter or margin, referenced at 16, and an outer perimeter or margin, referenced at 18, which together define the annular periphery of the retainer which, in turn, defines an opening, 19, of a closed geometric shape. Although the shape of retainer 12 is shown for purposes of illustration to be generally rectangular, such shape alternatively may be square or otherwise regular polygonal, irregular, or circular, elliptical, otherwise arcuate depending upon the intended application. In the normal, planar state of gasket 10 which is depicted in FIGS. 1 and 2, the enclosed polygonal shape of retainer 12 extends within a given first plane to a first diametric extent, designated by arrows 20a–b, along a first or progression of first axes, represented at 22, 22', and 22", and to a second diametric extent, designated by arrows 24a–b, along a second or progression of second axes, represented at 26, 26', and 26", which is disposed within the given first plane generally perpendicular to each corresponding first axis 22.

Figure 2:
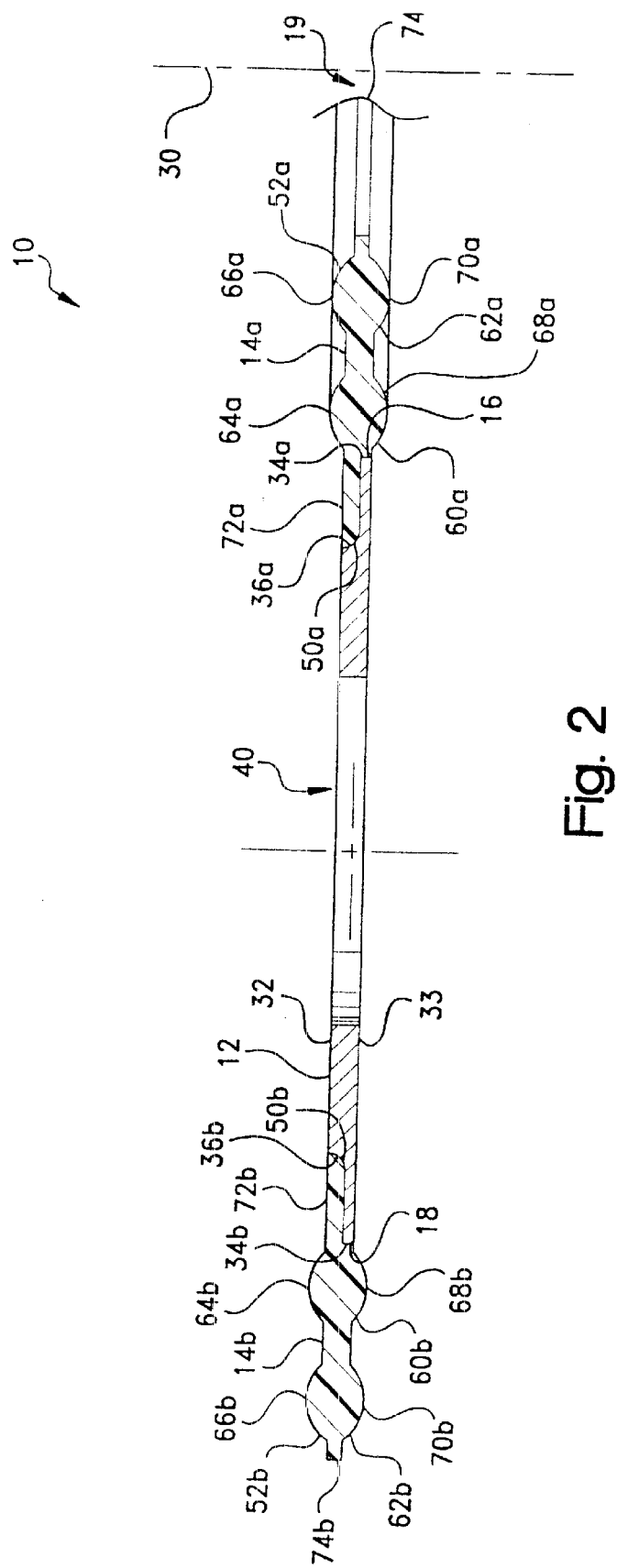
FIG. 2 is a cross-sectional view of the gasket of FIG. 1 taken through line 2—2 of FIG. 1.

As may be seen with momentary reference to the cross-sectional view of FIG. 2, retainer 12 further is formed relative to a central vertical axis, 30, thereof as having mutually-opposing upper and lower radial surfaces, 32 and 33, respectively, which extend generally perpendicular to axis 30 intermediate the inner and the outer perimeter 16 and 18 of the retainer 12, and as having mutually-opposing inner and outer axial surfaces, 34a–b, respectively, which extend generally parallel to axis 30 in defining the corresponding inner and outer perimeter 16 and 18 of the retainer. Preferably, the axial surfaces 34 are configured for the molding or other attachment of seal elements 14 thereto as including a peripheral undercut, 36a–b, which functions as a flash control channel and additionally provides an increased bondline surface for the seal element.

Returning to the plan view of FIG. 1, the inner and outer perimeters 16 and 18 of retainer 12 define a widthwise extent, referenced at "w", of the gasket therebetween which is sized such that gasket is receivable intermediate the interface surfaces to be sealed. Depending upon the configuration of the interface surfaces, retainer 12 additionally may be provided as including a plurality of throughbores or apertures, one of which is referenced at 40 for the location and alignment of the gasket 10 between these surfaces. As may be seen with momentary reference to the cross-sectional view of FIG. 2, each of the apertures 40 is formed into the retainer to extend axially through the upper and lower surfaces 32a–b thereof intermediate the inner perimeter 16 and the outer perimeter 18. The apertures 40 particularly may be spaced-apart along the retainer as disposed along a predefined bolt path and are employed for receiving the bolts or other fasteners which are conventionally used for coupling the interface surfaces under a predetermined torque load. Advantageously, apertures 40 in conjunction with retainer 12 additionally provide a positive stop delimiting the compression of the gasket in avoiding the over-compression thereof during installation or maintenance.

Retainer 12 may be fabricated as a metal molding or, preferably, stamping, with the apertures 40 being die cut therein. Suitable metal materials for the construction of retainer 12 include aluminum, steel, stainless steel, copper, brass, titanium, nickel, and alloys thereof, with aluminum being preferred for many applications. The metal may be anodized, plated, or otherwise for increased corrosion resistance. Depending upon its material of construction and the intended application, retainer 12 will have an axial thickness of less than 30 mils and, preferably, about 25 mils or less.

With retainer 12 being provided as has been described, each of the seal elements 14 may be adhesively bonded, interference fit, molded, or otherwise attached to or supported on a corresponding perimeter 16 or 18 of the retainer as a preferably continuous or, alternatively, discontinuous ring, bead, or other annulus of an elastomeric material to complete the construction of gasket 10. In the illustrated configuration of FIG. 1, and as may be seen also in the cross-sectional view of FIG. 2, each of the first and second seal elements 14a–b is formed as having, respectively, an inboard side, 50a–b, and an opposing outboard side, 52a–b, which defines the corresponding inner or outer sealing periphery of the gasket 10. Particularly, the inboard side 50a of the seal element 14a is attached to the inner perimeter 16 of the retainer 12 such that the outboard side 52a of the element 14a thereby defines the inner periphery of the gasket 10 in extending continuously about the retainer inner perimeter 16. Similarly, the inboard side 50b of the seal element 14b is attached to the outer perimeter 18 of the retainer 12 such that the outboard side 52b of the element 14b defines the outer periphery of the gasket 10 in extending continuously about the retainer outer perimeter 18.

For the axial, sealing compression of the seal elements 14 between the mating interface surfaces within the intended application, each of the elements 14a–b may be configured, as may be seen in FIG. 2, as having concentric inner, 60a–b, and outer, 62a–b, bead portions for effecting a redundant first and second sealing of the interface surfaces. Depending upon the geometry of those surfaces, the bead portions 60 and 62 may be provided to extend axially beyond the corresponding radial surfaces 32 of the retainer 12 in having a nominal axial cross-sectional thickness that is from about 1–100 mils greater than the nominal axial thickness of retainer. Bead portions 60 and 62 may be shaped, as is shown, to have a generally circular or elliptical cross-sectional geometry, but alternatively may be configured as being lobe or otherwise arcuate-shaped. The bead portions 70 may be of any radial extent, but typically will be between about 0.030–0.125 inches wide for most applications.

In the described configuration, each of the bead portions 60 and 62 presents oppositely disposed, generally hemi-spherical upper, 64a–b and 66a–b, and lower, 68a–b and 70a–b, bearing surfaces which together define redundant upper and lower sealing surfaces of the gasket 10. Each of the seal elements 14 is shown in FIG. 1 to extend about the peripheries of retainer 12 for generally coaxial registration with the margins of the interface faces of the application, although it will be appreciated that different geometries of gasket 10 may be envisioned depending upon the configuration of the corresponding interface surfaces of the intended application.

In the manufacture of gasket 10, the corresponding axial surfaces 34 and channels 36 of the retainer 12 may be primed with a bonding agent to assist in the chemical bonding of the seal elements 14 thereto. The primed retainer 12 then may be placed into a heated molded cavity for the injection, compression, or transfer molding of an uncured rubber or other elastomeric compound forming the seal elements 14. Each of the elastomeric seal elements 14 thereby may be formed and cured-in-place as vulcanized directly onto retainer 12. The inboard mold flash, 72a–b, may be seen in the cross-sectional view of FIG. 2 to be retained within a corresponding channel 36. The outboard mold flash, 74a–b, need not be removed as having no effect on the sealing performance of the gasket 10. Alternatively, each of the elastomeric seal elements 14 may be molded in a separate operation and bonded to retainer 12 using an adhesive or the like.

Each of the seal elements 14 preferably is formed of a rubber or other elastomeric material which may be selected specifically for high temperature performance or otherwise for compatibility with the fluid being handled. Suitable materials include natural rubbers such as Hevea, as well as thermoplastic, i.e., melt-processible, or thermosetting, i.e., vulcanizable, synthetic rubbers such as fluoropolymers, chlorosulfonate, polybutadiene, polybutadiene, buna-N, butyl, neoprene, nitrile, polyisoprene, silicone, fluorosilicone, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Advantageously, seal elements 14 exhibit a reduced yield stress as compared to the metal retainer member 12 and, accordingly, are thereby deformable for conforming to any irregularities between the interface surfaces of the structures being sealed. As a given compressive load is applied by the tightening of the bolts which may be used to fasten those interface surfaces, an increased bearing stress is provided about along the margins thereof by virtue of the reduced surface area contact of the bearing surfaces 64, 66, 68, and 70 of the seal members on the interface surfaces. This increased stress will be sufficient to exceed the reduced yield stress of the seal element for the deformation thereof effecting the fluid-tight sealing of the interfacing surfaces.

In service, it has been observed that the provision of seal elements 14 advantageously facilitates the installation and replacement of gasket 10 in accommodating for tolerances or other minor differences in the torque load of the bolts or other fastening members conventionally employed to join the interfacing surfaces. That is, by virtue of the resiliency of the elastomeric seal elements 14, the fluid integrity of the gasket 10 may be maintained to some degree even if the joint spacing between the interfacing surface is less than exactly uniform. The seal elements 14, moreover, may be used to develop a hermetic seal which is especially useful in petrochemical and other applications to control the fugitive emission of VOC's and other pollutants.

Moreover, the combination of a relatively incompressible retainer 12 and relatively compressible seal elements 14 further provides a gasket construction which minimizes torque loss and thereby obviates much of the need for the periodic retorting of the fastening members used to secure the interfacing surfaces. That is, it is well-known that gaskets of the type herein involved may develop a compression set which is manifested by fluid leaks as the tension in the bolts is relaxed and the fluid-tight sealing of the interfacing surfaces is compromised. In this regard, the provision of seal elements 14 ensures positive sealing, with retainer 12, in turn, synergistically providing generally non-yielding contact in establishing an alternative load torque path minimizing the compression set and leak potential of the gasket 10. In the case of a metal retainer 12, such contact additionally affords improved heat transfer between the interface surfaces, and also develops relatively high seal stresses for assured fluid-tight sealing of the interfacing structures.

Indeed, the gasket 10 of the invention is made to be flexible notwithstanding the presence of the metal retainer 12. In this regard, the use of a retainer allows the mating parts to carry stress loads which otherwise would cause the deformation or extrusion of a gasket which lacked a metal retainer. When employed, for example, as an access door seal for an aircraft wing or other superstructure, the gasket of the invention allows the door to carry some portion of the stress load in the wing. In this regard, the use of such a gasket has been observed to minimize stress cracking in the wring skin by reducing the stress at the corners of the access door opening.

Figure 3:
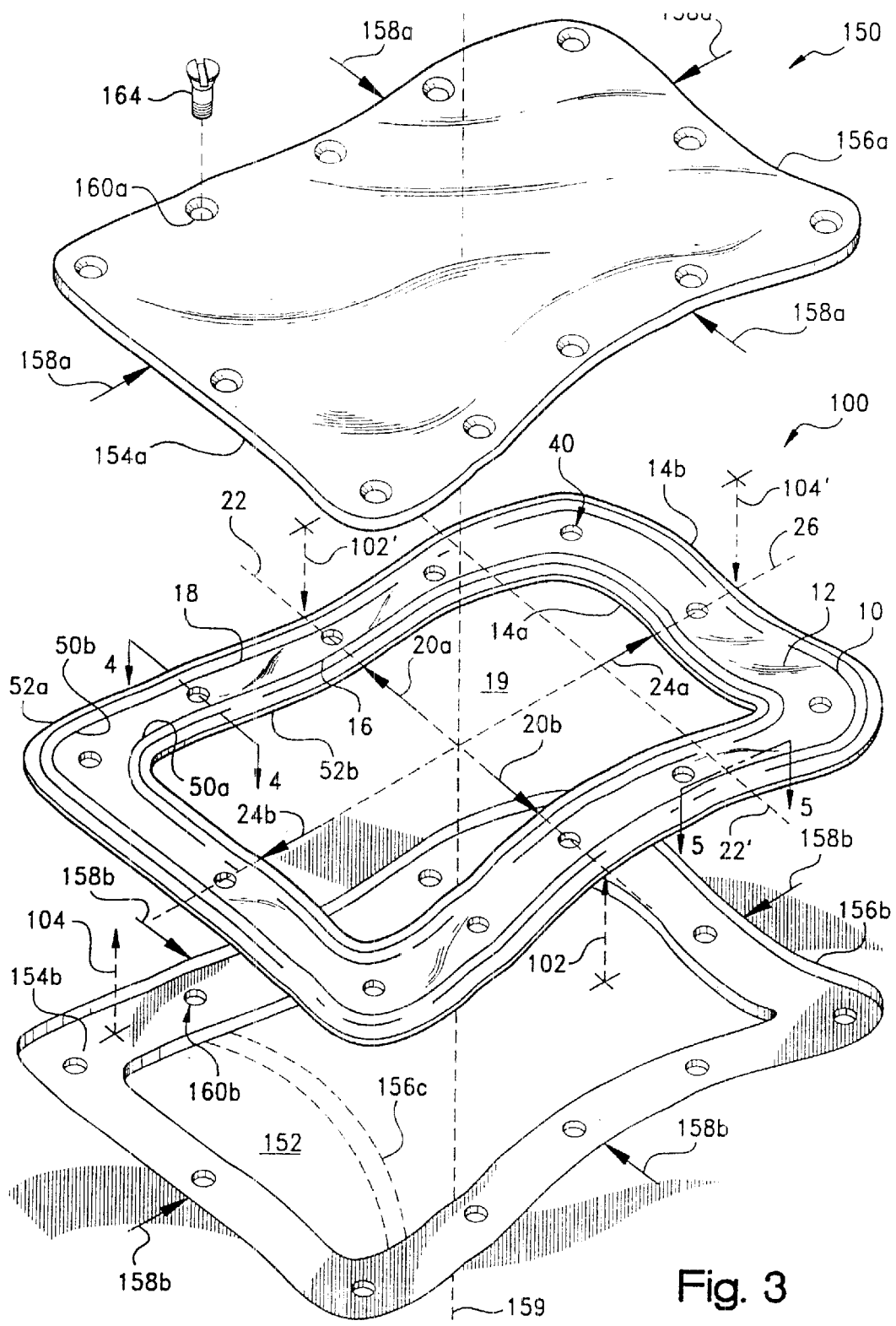
FIG. 3 is an exploded perspective assembly view showing the gasket of FIG. 1 in a flexed orientation as stressed between a pair of mating, mutually-opposed interface surfaces within a representative joint assembly.

Looking next momentarily to FIG. 3, gasket 10 of the invention reappears in perspective view at 100 in a flexed orientation as assumed when compressed between a pair of compound-curved interface surfaces. In the stressed state 100 of gasket 10, retainer 12 may be seen to be flexible in its first diametric extent 20a–b through one or more axis 22 along at least one first radius of curvature, referenced at 102, which is disposed within a corresponding second plane generally perpendicular to the first plane of the normal or planar state of gasket 10 shown in FIG. 1, and in its second diametric extent 24a–b through one or more axis 26 along at least one second radius of curvature, referenced at 104, which is disposed within a corresponding third plane generally perpendicular to the first and second planes. For most applications, the first and second radii of curvatures 102 and 104 generally will be some fraction or multiple of the length of corresponding diametric extent 20 or 24.

As used herein, "radius of curvature" should be understood to refer to an absolute value irrespective of any positive or negative degree. In this regard, radii 102 and 104 both may be positive, as shown at 102 and 104, or negative, as is shown at 102' and 104', or any combination thereof as is depicted in the illustration of FIG. 3. Indeed, the ability to conform to compound curved surfaces irrespective of whether the curvature is simple or compound in one or more directions, e.g., sinusoidal, or planes, i.e., torsional, is seen as a unique a advantage of the invention herein involved.

So constructed, gasket 10 thereby may be made to conform to the curvatures of the interface surfaces in effecting the fluid-tight sealing thereof. Advantageously, however, in retainer 12 being provided to be resilient, gasket 10 may be made to substantially recover without appreciable set or work hardening to its normal or planar state of FIG. 1 upon being removed from compression between the interface surfaces. Such recovery capability is particularly desirable when used within access panel or door assemblies which are opened and closed frequently.

Figure 4:
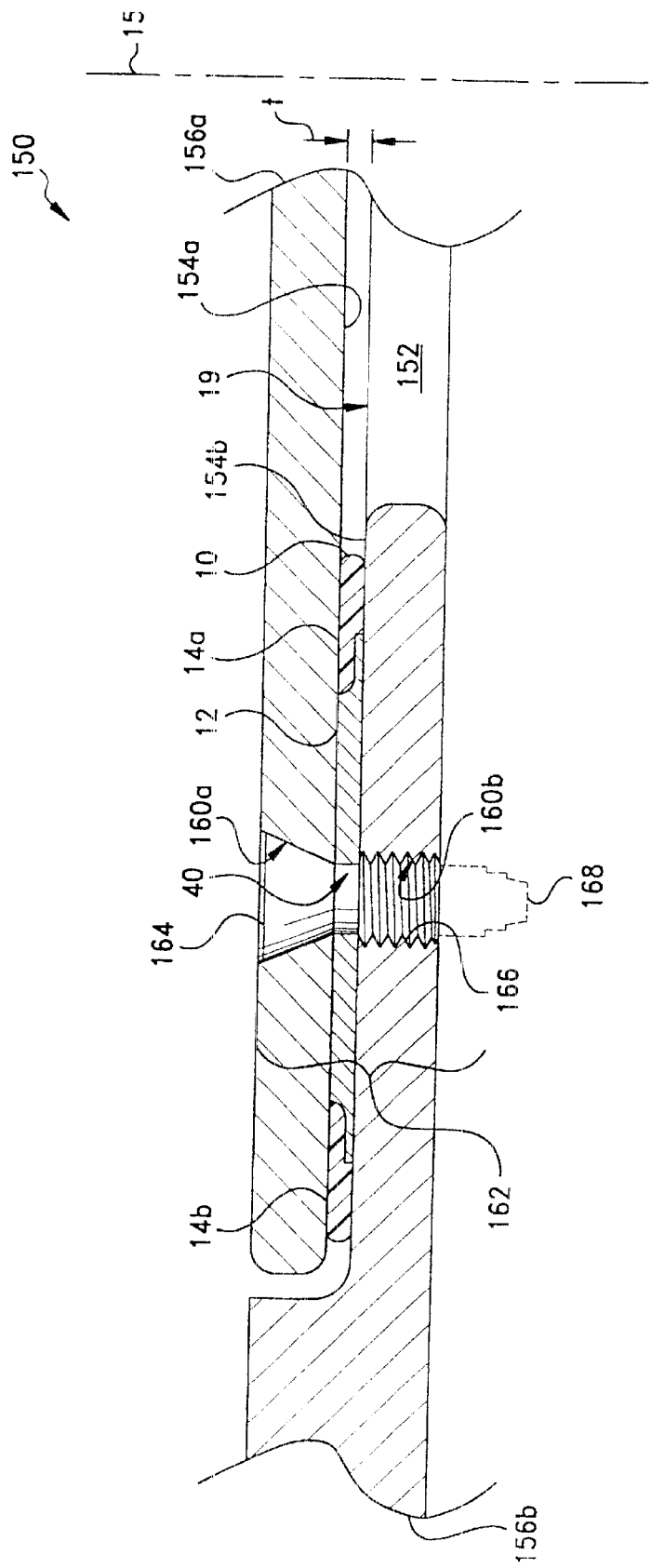
FIG. 4 is a fragmentary cross-sectional view of the assembly of FIG. 3 taken through line 4—4 of FIG. 3.
Figure 5:
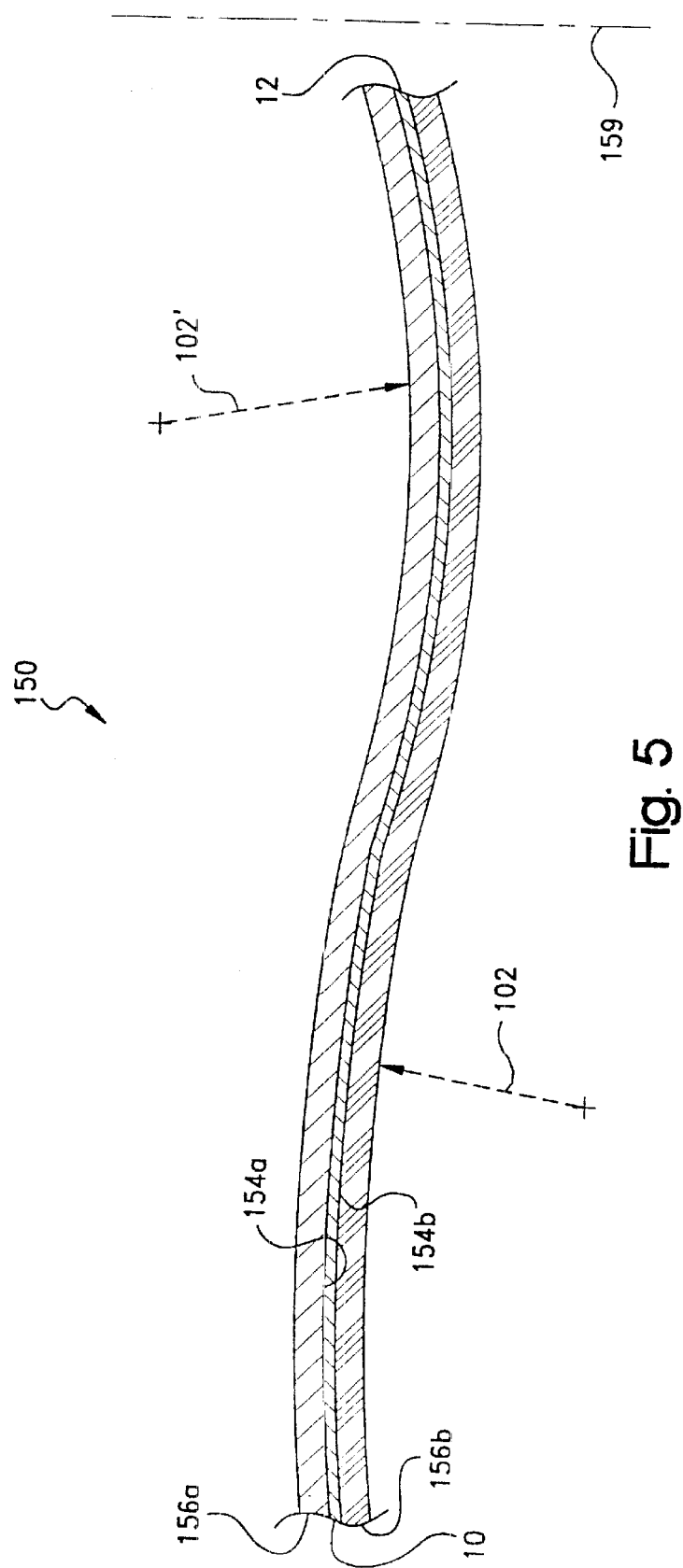
FIG. 5 is a cross-sectional view of the assembly of FIG. 3 taken through line 5—5 of FIG. 3.

By way of illustration, reference again may be had to the exploded view of FIG. 3, as now considered in conjunction with the cross-sectional assembly views of FIGS. 4 and 5, wherein shown generally at 150 is a representative joint assembly having an internal chamber, 152, which is sealed by means of gasket 10 of the present invention. Within the assembly 150, gasket 10 of the present invention is shown as registered between a pair of mutually-facing, axially spaced-apart interfaces surfaces, 154a–b. The surfaces 154 are presented by the corresponding structures 156a–b which may be, for example, an access door and a wing or other section of an aircraft superstructure. Gasket 10 is interposed between the interface surfaces 154 with the opening 19 of the gasket being aligned in general coaxial registration with the chamber 152.

The interface surfaces 154a–b each may be seen in FIG. 3 to have a radial extent, referenced by the arrows collectively designated 158a and 158b, respectively, and to be curved in one or more directions along axis 159 normal to the radial extents 158. A plurality of bores, one of which is referenced at 160a for surface 154a and at 160b for surfaces 154b, are defined within each of interface surfaces 154 as disposed adjacent chamber 152. Each of the bores 160 is in alignment with a corresponding bore of the other surface 154 to define a hole, one of which is referenced at 162 in FIG. 4, configured to receive an associated fastening member, which is illustrated at a threaded bolt, 164. Bolts 164 connect surfaces 154, such as by being thereby engaged with an internally-threaded portion, referenced at 166 in FIG. 4, of bore 160b, and may be tightened to a predetermined torque to effect the conforming compression of gasket 10 in a sealing engagement between interface surfaces 154. Alternatively, bolt 164 may be secured using an associated nut (not shown), as received through an associated nut plate, referenced in phantom in FIG. 4 at 168, which backs up the structure 162b.

Irrespective of the coupling arrangement, retainer 12 may be configured, as was aforementioned, to include a plurality of bolt holes for the alignment of the gasket between the flanges. As is shown in FIG. 4 for the bolt hole referenced at 40, each of these holes may be disposed in registration with a corresponding one of the fastener member holes 162 for receiving one of the bolts 164 therethrough.

Upon the tightening of bolts 164 to a predetermined torque, and as may be seen best in the cross-sectional view of FIG. 4, seal elements 14 are compressed between interface surfaces 154 to a thickness, referenced at t, which is equal to the thickness of the retainer 12. In the embodiment of gasket 10 shown in FIGS. 3–5, a redundant, i.e., double, inner seal, 170, is effected by beads 60a and 62a (FIG. 2) of element 14a for the fluid-tight sealing of chamber 152, with a redundant outer seal, 172, being effected by beads 60b and 62b (FIG. 2) of element 14b for the protection of the bolts 164 from the environment.

Concomitantly with the compression of the seal elements 14, the gasket retainer is curved, depending upon the curvature of the surfaces 154, along one or both of the radii 102 and 104 (with only the "sinusoidal" curvature through axes 22 and 22' along the radii 102 and 102' being seen in the cross-sectional view of FIG. 5) to conform to the surfaces 154. Upon removal from between the surfaces 154, however, gasket 10 resiliently recovers to its normal, i.e., planar orientation of FIG. 1. Advantageously, the described configuration of gasket 10 of the invention also is adapted to seal non-curved, i.e., planar, interface surfaces.

Figure 6:
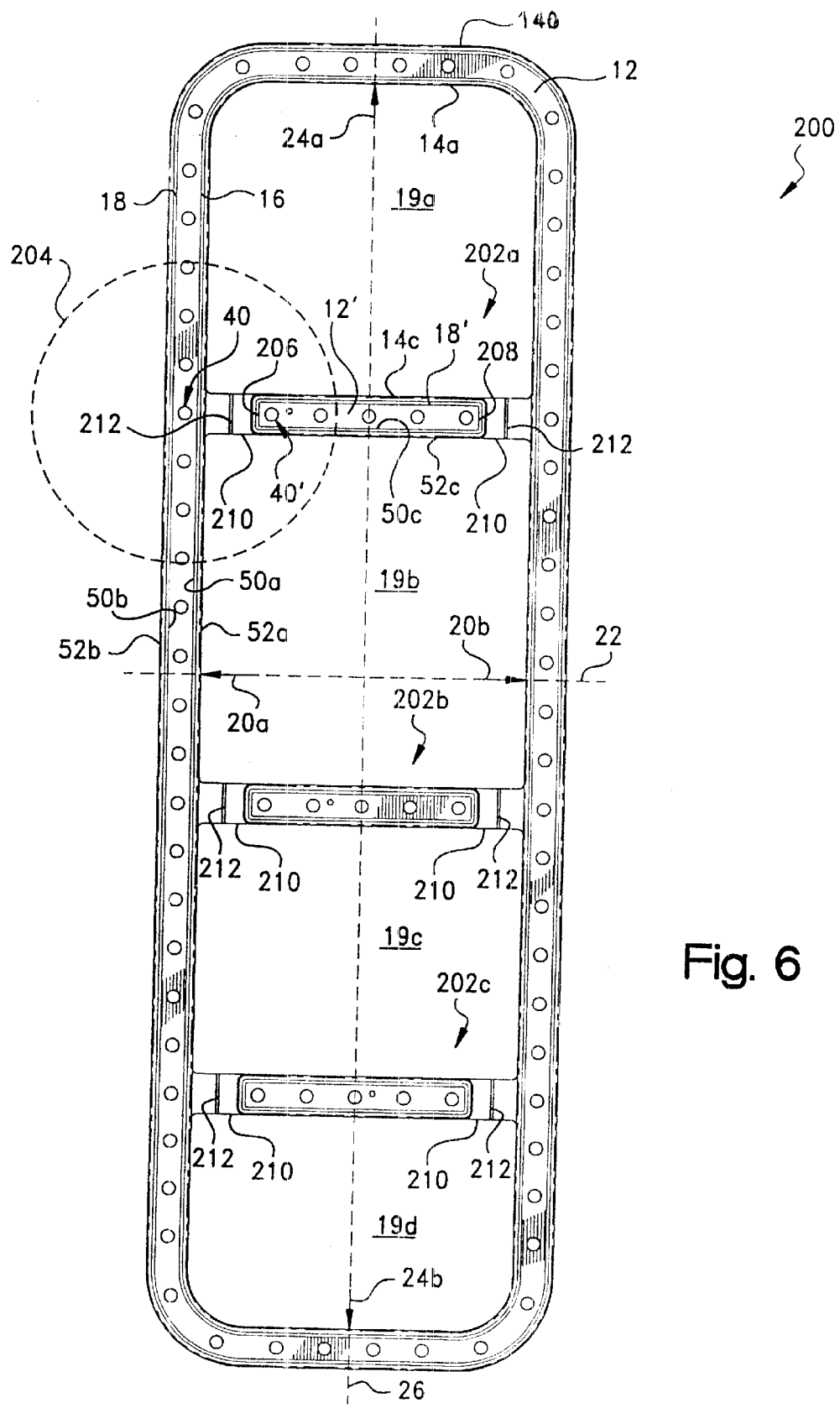
FIG. 6 is a plan view of an alternative embodiment of a flexible gasket according to the present invention.
Figure 7:
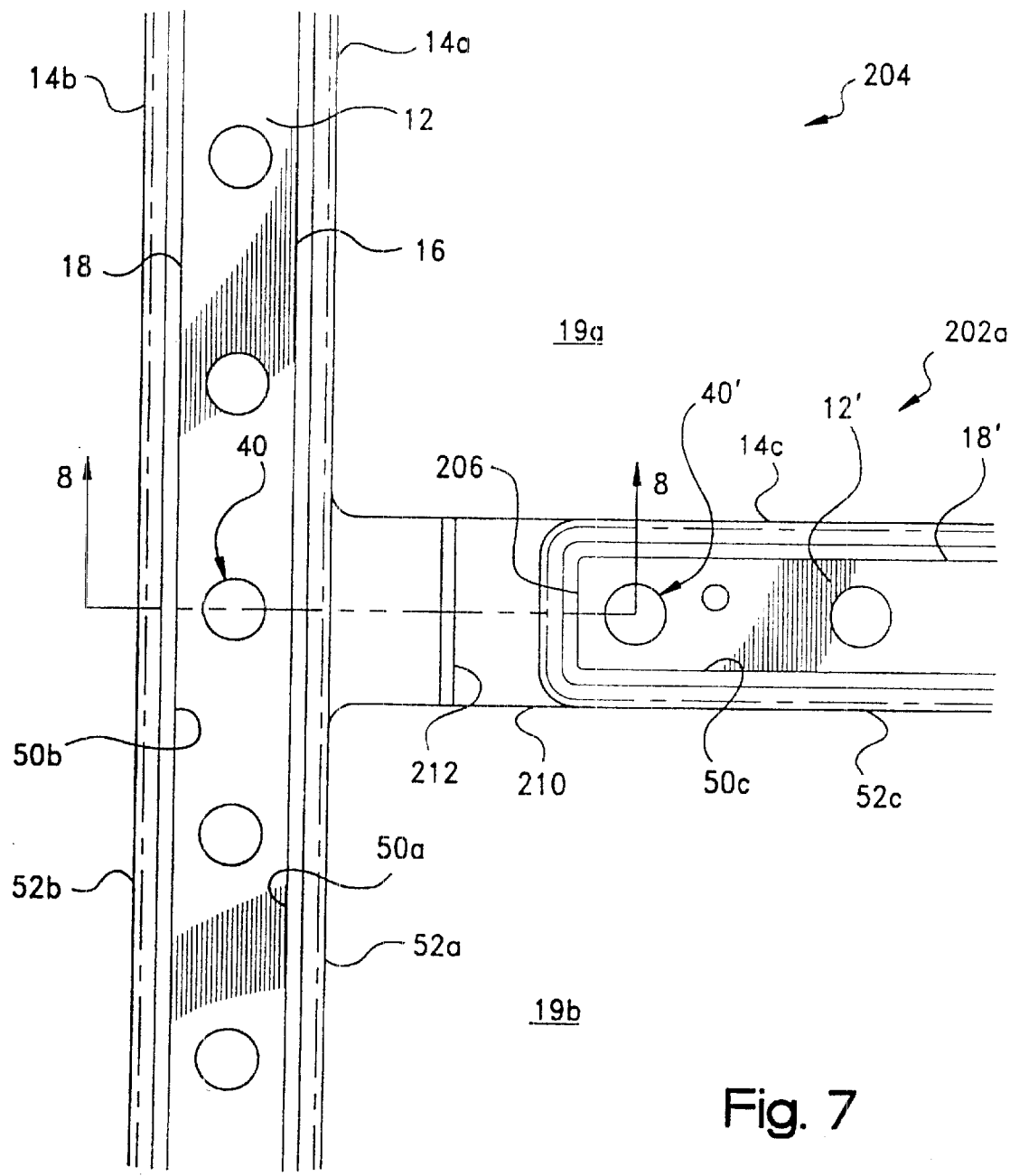
FIG. 7 is a magnified plan view of a section of the gasket of FIG. 7.

Turning next to FIG. 6, an alternative embodiment of gasket 10 of the present invention is shown generally at 200. In basic construction, gasket 200 of the invention is identical to that of gasket 10 of FIG. 1, with the exception that opening 19 is divided into a plurality of separate openings, referenced at 19a–d, via the provision of one or more dividers, 202a–c, which extend laterally across one of the diametric extents 20 or 24 of the gasket.

As may be seen best with additional reference to the magnified view of 7 wherein the portion of the gasket 200 referenced at 204 in FIG. 6 is shown in enhanced detail, each of the dividers 202 includes an elongate second retainer portion, 12', which is identical in construction to the first retainer portion 12, and which extends intermediate a first and second end, 206 and 208, respectively. A third seal element, 14c, is bonded, molded, or otherwise attached to or supported on the outer perimeter or margin 18' of the retainer 12'. Although retainer 12' is shown for purposes of illustration to be generally linear, it alternatively may be arcuate depending upon the intended application.

Figure 8:
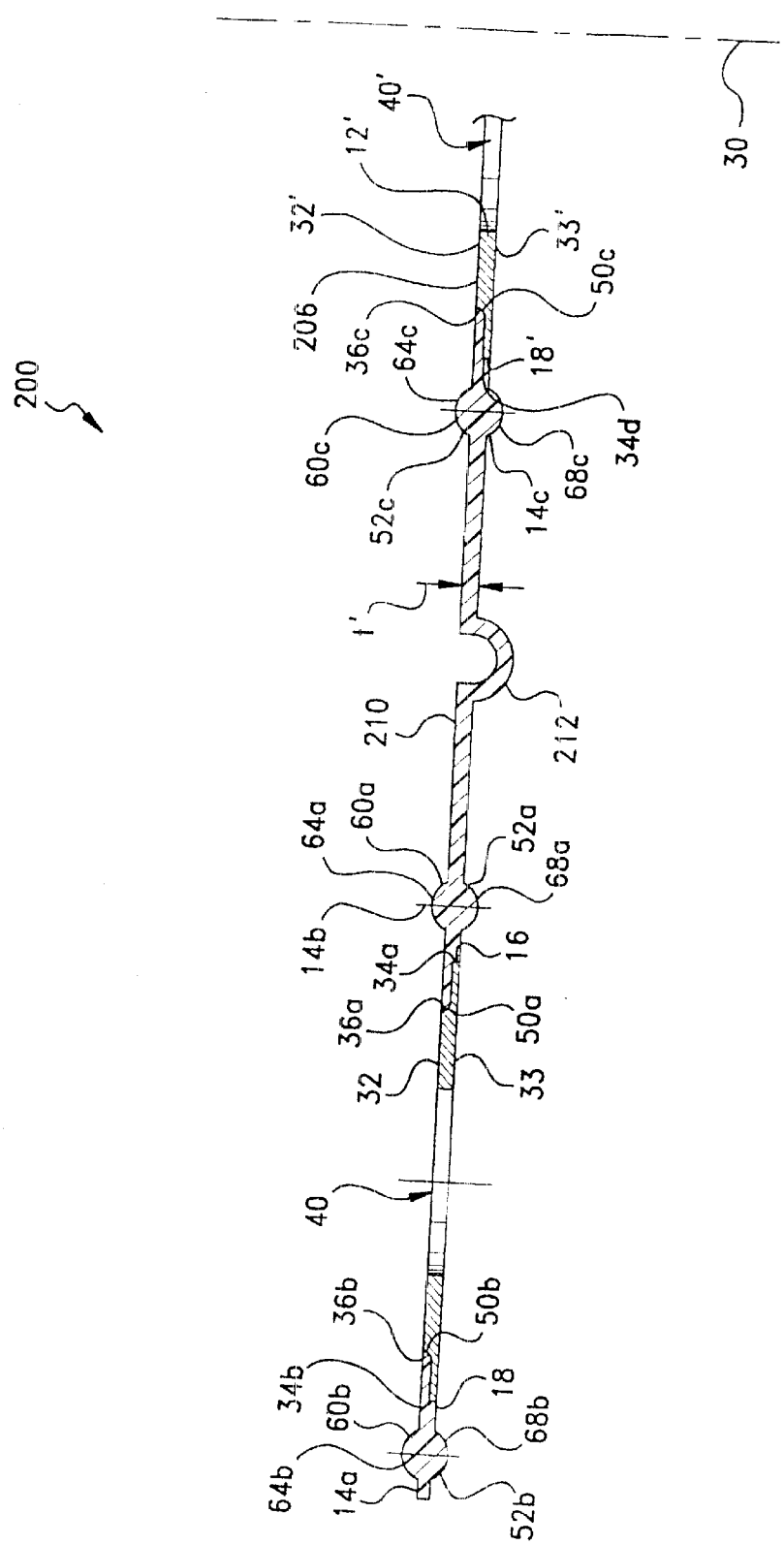
FIG. 8 is a cross-sectional view of the gasket of FIG. 7 taken through line 8—8 of FIG. 6.

In further accordance with the precepts of the present invention, each of the retainer ends 206 and 208 of each of the dividers 202 are flexibly joined to the main retainer 12 by means of an associated diaphragm, commonly referenced at 210. With additional reference to the cross-sectional view of FIG. 8, each of the diaphragms 210 may be seen in the illustrated embodiment to be integrally-molded of a rubber or other elastomeric material with seal elements 14a and 14c as a thin, flexible sheet which extends between and joins the elements 14a and 14c. As is shown in FIG. 8, each of the diaphragms 210 may be of a thickness, referenced at t', which nominally may be about equal to the thickness of the retainers 12 and 12', and to include, preferably, a central furrow portion, commonly referenced at 212. Furrow portion 12 functions as a type of hinge to increase the flexibility of the diaphragm 210, and additional accommodates for the shrinkage of the rubber or other elastomeric material forming the diaphragm. Advantageously, the provision of the diaphragms 210 allows each of the dividers 202 to be flexibly joined to the retainer 12 in a one-piece assembly which facilitates installation. In this regard, with one or more of the dividers 202, the versatility of the gasket 10 of the invention may be extended to the sealing of various structure which require a separate fluid seal within the interior of the gasket structural configurations.

Figure 9:
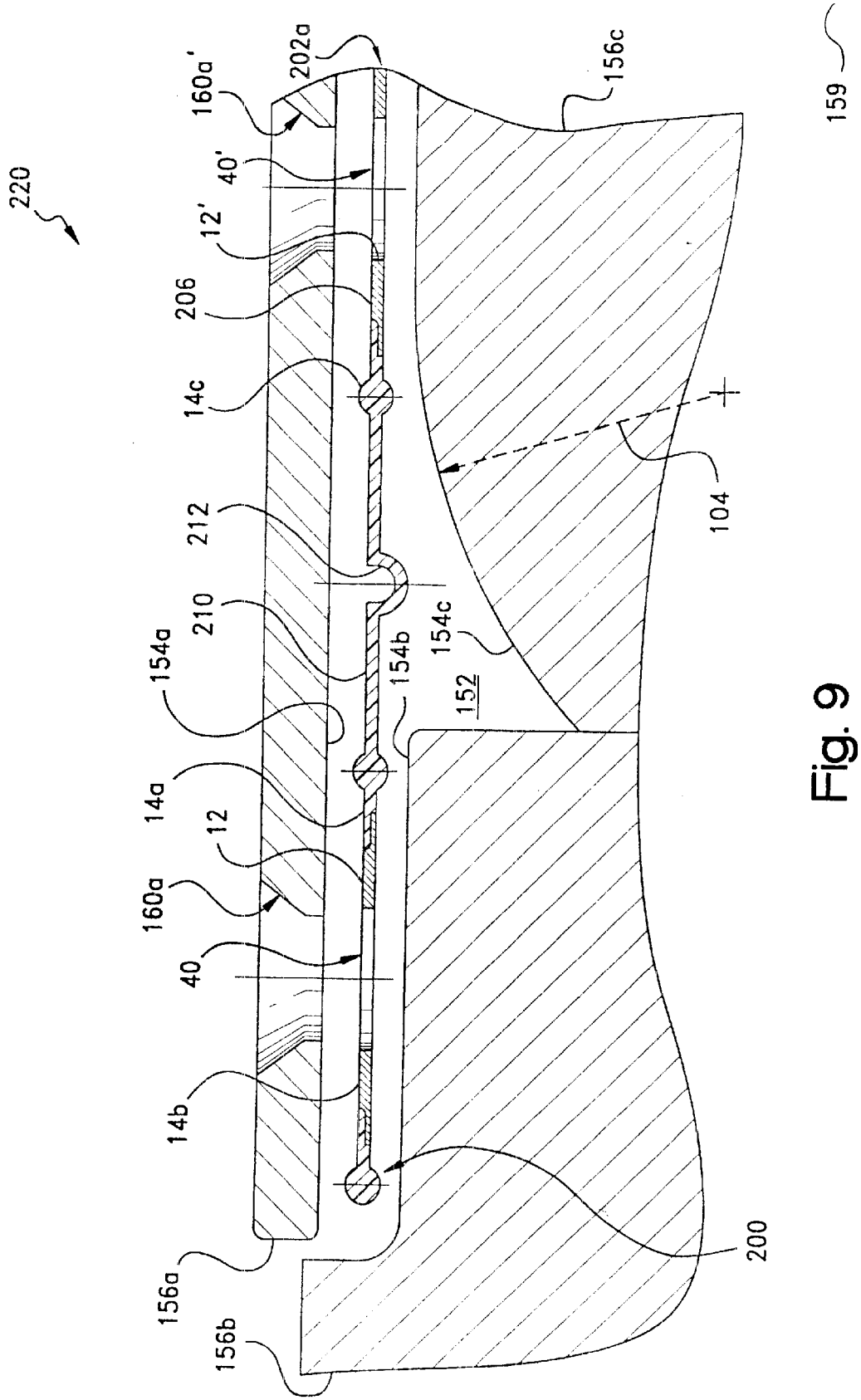
FIG. 9 is an exploded cross-sectional view of a representative joint assembly including the gasket of FIG. 7.

For example, reference may be had to the cross-sectional view of FIG. 9 wherein a representative joint assembly incorporating gasket 200 of the invention is shown generally at 220. Within such assembly 220, there additionally exists the need to provide a discrete fluid seal wholly within the seal provided by element 14a which maintaining the continuity of that seal. That is, a rib or similar structure, referenced at 156c in FIG. 8 and also in phantom in the perspective view of FIG. 3, is disposed to extend across chamber 152 as a stiffener for the door 156a. It therefore becomes necessary to provide a separate fluid seal between the interface surface 154c of the rib 156c and the opposing interface surface 154a of the door 156a to close the leak path through bolt holes 160a' thereof without disrupting the continuous inner peripheral sealing of element 14a. Advantageously, then, by virtue of the dividers 202, the required discrete seal may be developed via the compression of seal element 14c, which surrounds the path of the bolt holes 160a', independently of the inner peripheral seal. Concomitantly with the compression of the seal element 14c, the retainer 12' may be curved, such along one of the radii 102 or, as shown, 104, as will depend upon the curvature of the surface 154. Moreover, by virtue of the flexibility of the diaphragm members 210, differences in height between the interface surface 154c of the rib 156c and the interface surface 154b of the superstructure 156b may be accommodated while still maintaining gasket 200 as an integral, one-piece structure.

Thus, a unique gasket construction for access doors and other commercial, industrial, or military applications is described which exhibits reliable sealing properties and torque retention with a minimum of compression even in the sealing of complex curved surfaces. Additional advantages include a gasket construction which is economical to manufacture.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A gasket assembly for interposition between a first and a second interface surface each having a radial extent and being curved in at least one axial direction normal to said radial extent, said second interface surface being disposed in mutually-facing opposition with said first interface surface, said assembly comprising:

a resilient primary retainer formed of a metal material and having an inner perimeter and an outer perimeter defining an enclosed geometric shape which extends in a normal state of said gasket assembly within a first plane to a first diametric extent along at least one first axis, and to a second diametric extent along at least one second axis disposed within said first plane generally perpendicular to said first axis, said primary retainer being flexible in said first diametric extent along at least one first radius of curvature disposed within a corresponding second plane generally perpendicular to said first plane, and in said second diametric extent along at least one second radius of curvature disposed within a corresponding third plane generally perpendicular to said first and said second plane, and said primary retainer having an inner axial surface which defines the inner perimeter thereof, and an outer axial surface which defines the outer perimeter thereof; and at least one generally annular primary seal element formed of an elastomeric material and compressible axially intermediate the first and second interface surfaces for effecting one or more fluid-tight seals therebetween, each said primary seal element being supported on said primary retainer and attached to a corresponding one of said inner or outer axial surface of said primary retainer, and to extend coaxially about at least a portion of said inner or said outer perimeter of said primary retainer, and having oppositely-disposed first and second radial sealing surfaces configured for abutting, sealing contact with a corresponding one of the interfaces surfaces, whereby with the gasket assembly being interposed between the first and second interface surfaces with the first and second radial sealing surfaces of each said primary seal element being disposed in abutting contact with a corresponding one of the interface surfaces, each said primary seal element is compressible axially intermediate the interface surfaces effecting in a stressed state of said gasket assembly one or more fluid-tight seals between the interface surfaces, said primary retainer being curved along one or both said first and said second radius of curvature in said stressed state of said gasket assembly to conform to the interface surfaces, and whereby said gasket assembly substantially recovers to said normal state from said stressed state upon being removed from compression between the interface surfaces.

2. The gasket assembly of claim 1 wherein said metal material forming said primary retainer is selected from the group consisting of aluminum, steel, stainless steel, copper, brass, titanium, nickel, and alloys thereof.

3. The gasket assembly of claim 1 wherein said elastomeric material forming said primary seal element is selected from the group consisting of natural rubbers and synthetic rubbers.

4. The gasket assembly of claim 1 wherein said primary retainer has a first radial surface extending intermediate the inner and the outer perimeter thereof, and a second radial surface disposed opposite the first radial surface and extending intermediate the inner and the outer perimeter thereof, said first and said second radial surface defining an axial thickness dimension of said primary retainer therebetween, said axial thickness dimension being about 25 mils or less.

5. The gasket assembly of claim 1 wherein each said primary seal element extends substantially continuously about the entirety of said inner or said outer perimeter of said primary retainer.

6. The gasket assembly of claim 1 wherein each said primary seal element is formed as having one or more generally-spherical bead portions, each of said bead portions defining a corresponding said first and said second radial sealing surface of said primary seal element.

7. The gasket assembly of claim 1 wherein each of interface surfaces further includes one or more bores in registration with a corresponding one of the bores of the other interface surface for defining a hole configured to receive an associated fastener member, and wherein said primary retainer further comprises one or more apertures formed axially therethrough intermediate the inner and the outer perimeter thereof, each of said apertures being configured for generally coaxial registration with a corresponding one of the fastener member holes.

8. The gasket assembly of claim 1 wherein said assembly further comprises:

at least one divider member disposed within the enclosed geometric shape of said primary retainer to extend within said first plane across one of the diametric extents thereof for interposition between one of the first and second interface surfaces and a third interface surface disposed in mutually-facing opposition with said one of the first and second interface surfaces, each said divider member including:

a secondary retainer extending intermediate opposite first and second ends, and having an outer margin; and a generally annular secondary seal element formed of an elastomeric material and compressible axially intermediate said one of the first and second interface surfaces and said third interface surface for effecting a second fluid-tight seal within said first fluid-tight seal, said secondary seal element being supported on said secondary retainer to extend along at least a portion of the outer margin thereof, and having oppositely-disposed first and second radial sealing surfaces configured for abutting, sealing contact with a corresponding one of the interfaces surfaces; and a first and a second diaphragm member each formed of an elastomeric material and extending intermediate said primary retainer and a corresponding one of said opposite first and second ends of said secondary retainer element to flexibly join said one of said ends to said primary retainer.

9. The gasket assembly of claim 8 wherein:

said third interface surface has a radial extent and is curved in at least one axial direction normal to said radial extent; and said secondary retainer is formed of a metal material and is resiliently flexible in said one of the diametric extents along the corresponding first or second radius of curvature, whereby said secondary retainer is curved along said corresponding first or second radius of curvature in said stressed state of said gasket assembly to conform to the third interface surface.

10. A joint assembly comprising:

a first and a second interface surface each having a radial extent and being curved in at least one axial direction normal to said radial extent, said second interface surface being disposed in mutually-facing opposition with said first interface surface; and a gasket interposed between said first and second interface surfaces, said gasket comprising:

a resilient primary retainer formed of a metal material and having an inner perimeter and an outer perimeter defining an enclosed geometric shape which extends in a normal state of said gasket within a first plane to a first diametric extent along at least one first axis, and to a second diametric extent along at least one second axis disposed within said first plane generally perpendicular to said first axis, said primary retainer being flexible in said first diametric extent along at least one first radius of curvature disposed within a corresponding second plane generally perpendicular to said first plane, and in said second diametric extent along at least one second radius of curvature disposed within a corresponding third plane generally perpendicular to said first and said second plane, and said primary retainer having an inner axial surface which defines the inner perimeter thereof, and an outer axial surface which defines the outer perimeter thereof; and at least one generally annular primary seal element formed of an elastomeric material and attached to a corresponding one of said inner or outer axial surface of said primary retainer, to each extend coaxially about at least a portion of said inner or said outer perimeter of said primary retainer, each said primary seal element having oppositely-disposed first and second radial sealing surfaces in abutting contact with a corresponding one of the interfaces surfaces, and being compressed axially intermediate said interface surfaces effecting one or fluid-tight seals between the interface surfaces, said primary retainer being curved along one or both said first and said second radius of curvature in a stressed state of said gasket by the compression of said primary seal elements to conform to said interface surfaces, primary whereby said gasket substantially recovers to said normal state from said stressed state upon being removed from compression between said interface surfaces.

11. The joint assembly of claim 10 wherein said metal material forming said primary retainer is selected from the group consisting of aluminum, steel, stainless steel, copper, brass, titanium, nickel, and alloys thereof.

12. The joint assembly of claim 10 wherein said elastomeric material forming said primary seal element is selected from the group consisting of natural rubbers and synthetic rubbers.

13. The joint assembly of claim 10 wherein said primary retainer has a first radial surface extending intermediate the inner and the outer perimeter thereof, and a second radial surface disposed opposite the first radial surface and extending intermediate the inner and the outer perimeter thereof, said first and said second radial surface defining an axial thickness dimension of said primary retainer therebetween, said axial thickness dimension being about 25 mils or less.

14. The joint assembly of claim 10 wherein each said primary seal element extends substantially continuously about the entirety of said inner or said outer perimeter of said primary retainer.

15. The joint assembly of claim 10 wherein each said primary seal element is formed as having one or more generally-spherical bead portions, each of said bead portions defining a corresponding said first and said second radial sealing surface of said primary seal element.

16. The joint assembly of claim 10 further comprising one or more fastener members and wherein:

each of said interface surfaces further includes one or more bores disposed in registration with a corresponding one of the bores of the other interface surface for defining a hole receiving an associated said fastener member; and said primary retainer has one or more apertures formed axially therethrough intermediate the inner and the outer perimeter thereof, each of said apertures being registered coaxially with a corresponding one of the fastener member holes and receiving an associated said fastener member therethrough.

17. The joint assembly of claim 10 wherein said assembly further comprising:

a third interface surface disposed in mutually-facing opposition with one of the first and second interface surfaces;

at least one divider member disposed within the enclosed geometric shape of said primary retainer to extend within said first plane across one of the diametric extents thereof, each said divider member being interposed between said one of the first and second interface surfaces and said third interface surface divider member and including:

a secondary retainer extending intermediate opposite first and second ends, and having an outer margin; and a generally annular secondary seal element formed of an elastomeric material and supported on said secondary retainer to extend along at least a portion of the outer margin thereof, said secondary seal element having oppositely-disposed first and second radial sealing surfaces disposed in abutting contact with a corresponding one of the interfaces surfaces and compressed axially intermediate said one of the first and second interface surfaces and said third interface surface effecting a second fluid-tight seal within said first fluid-tight seal; and a first and a second diaphragm member each formed of an elastomeric material and extending intermediate said primary retainer and a corresponding one of said opposite first and second ends of said secondary retainer element to flexibly join said one of said ends to said primary retainer.

18. The joint assembly of claim 17 wherein:

said third interface surface has a radial extent and is curved in at least one axial direction normal to said radial extent; and said secondary retainer is formed of a metal material and is resiliently flexible in said one of the diametric extents along the corresponding first or second radius of curvature, whereby said secondary retainer is curved along said corresponding first or second radius of curvature in said stressed state of said gasket to conform to the third interface surface.

19. A method of sealing a first and a second interface surface each having a radial extent and being curved in at least one axial direction normal to said radial extent, said second interface surface being disposable in mutually-facing, opposition with said first interface surface and said method comprising the steps of:

(a) providing a gasket assembly including:

a resilient primary retainer formed of a metal material and having an inner perimeter and an outer perimeter defining an enclosed geometric shape which extends in a normal state of said gasket assembly within a first plane to a first diametric extent along at least one first axis, and to a second diametric extent along at least one second axis disposed within said first plane generally perpendicular to said first axis, said primary retainer being flexible in said first diametric extent along at least one first radius of curvature disposed within a corresponding second plane generally perpendicular to said first plane, and in said second diametric extent along at least one second radius of curvature disposed within a corresponding third plane generally perpendicular to said first and said second plane, and said primary retainer having an inner axial surface which defines the inner perimeter thereof, and an outer axial surface which defines the outer perimeter thereof; and at least one generally annular primary seal element formed of an elastomeric material and compressible axially intermediate the interface surfaces for effecting one or more fluid-tight seals therebetween, (each said primary seal element being attached to a corresponding one of said inner or outer axial surface of said primary retainer to extend coaxially about at least a portion of said inner or said outer perimeter of said primary retainer, and having oppositely-disposed first and second radial sealing surfaces;

(b) interposing said gasket assembly between said interface surfaces such that each said primary seal element abuttingly contacts a corresponding one of the interfaces surfaces;

(c) compressing each said primary seal element axially intermediate said interface surfaces effecting one or more fluid-tight seals between the interface surfaces, said primary retainer being curved along one or both said first and said second radius of curvature in a stressed state of said gasket assembly by the compression of said primary seal elements to conform to said interface surfaces; and (d) removing said assembly from compression between said interface surfaces, said gasket assembly substantially recovering to said normal state from said stressed state.

20. The method of 19 wherein said metal material forming said primary retainer of said gasket assembly provided in step (a) is selected from the group consisting of aluminum, steel, stainless steel, copper, brass, titanium, nickel, and alloys thereof.

21. The method of 19 wherein said elastomeric material forming said primary seal element of said gasket assembly provided in step (a) is selected from the group consisting of natural rubbers and synthetic rubbers.

22. The method of 19 wherein said primary retainer of said gasket assembly provided in step (a) has a first radial surface extending intermediate the inner and the outer perimeter thereof, and a second radial surface disposed opposite the first radial surface and extending intermediate the inner and the outer perimeter thereof, said first and said second radial surface defining an axial thickness dimension of said primary retainer therebetween, said axial thickness dimension being about 25 mils or less.

23. The method of claim 19 wherein each said primary seal element of said gasket assembly provided in step (a) extends substantially continuously about the entirety of said inner or said outer perimeter of said primary retainer.

24. The method of 19 wherein each said primary seal element of said gasket assembly provided in step (a) is formed as having one or more generally-spherical bead portions, each of said bead portions defining a corresponding said first and said second radial sealing surface of said primary seal element.

25. The method of claim 19 wherein said gasket assembly further includes:

at least one divider member disposed within the enclosed geometric shape of said primary retainer to extend within said first plane across one of the diametric extents thereof for interposition between one of the first and second interface surfaces and a third interface surface disposable in mutually-facing opposition with said one of the first and second interface surfaces, each said divider member being interposed between said one of the first and second interface surfaces and said third interface surface divider member and including:

a secondary retainer extending intermediate opposite first and second ends, and having an outer margin; and a generally annular secondary seal element formed of an elastomeric material and supported on secondary retainer to extend along at least a portion of the outer margin thereof, said secondary seal element having oppositely-disposed first and second radial sealing surfaces disposed in abutting contact with a corresponding one of the interfaces surfaces and compressed axially intermediate said one of the first and second interface surfaces and said third interface surface effecting a second fluid-tight seal within said first fluidtight seal; and a first and a second diaphragm member each formed of an elastomeric material and extending intermediate said primary retainer and a corresponding one of said opposite first and second ends of said secondary retainer element to flexibly join said one of said ends to said primary retainer.

26. The method of claim 25 wherein:

said third interface surface has a radial extent and is curved in at least one axial direction normal to said radial extent; and said secondary retainer is formed of a metal material and is resiliently flexible in said one of the diametric extents along the corresponding first or second radius of curvature, whereby said secondary retainer is curved along said corresponding first or second radius of curvature in said stressed state of said gasket assembly to conform to the third interface surface.

27. A gasket assembly for interposition between a first interface surface and a second and a third interface surface, said second and said third interface surface being disposed in mutually-facing opposition with said first interface surface, said assembly comprising:

a primary retainer having an inner perimeter and an outer perimeter defining an enclosed geometric shape which extends to a first diametric extent along at least one first axis, and to a second diametric extent along at least one second axis disposed generally perpendicular to said first axis;

at least one divider member disposed within the enclosed geometric shape of said primary retainer to extend across one of the diametric extents thereof for interposition between the first interface surface and the second and third interface surfaces, each said divider member including a secondary retainer extending intermediate opposite first and second ends; and a first and a second diaphragm member each formed of an elastomeric material and each extending intermediate said primary retainer and a corresponding one of said opposite first and second ends of said secondary retainer element to flexibly join said one of said ends to said primary retainer.

* * * * *